United States Patent [19]
Gurwicz et al.

[11] Patent Number: 5,371,668
[45] Date of Patent: Dec. 6, 1994

[54] RESONANT INVERTER

[75] Inventors: David Gurwicz, Gateshead; Paul Morris, Blackhall Mill, both of England

[73] Assignee: Nada Electronics Limited, Tyne & Wear, England

[21] Appl. No.: 955,856

[22] PCT Filed: Jun. 21, 1991

[86] PCT No.: PCT/GB91/01008
§ 371 Date: Jun. 21, 1993
§ 102(e) Date: Jun. 21, 1993

[87] PCT Pub. No.: WO91/20172
PCT Pub. Date: Dec. 26, 1991

[30] Foreign Application Priority Data

Jun. 21, 1990 [GB] United Kingdom ............ 9013819.9

[51] Int. Cl.⁵ .................. H02M 7/5387; H05B 37/02
[52] U.S. Cl. ............................ 363/132; 315/209 R
[58] Field of Search ........... 363/98, 132; 315/209 R, 315/219; 323/235, 239

[56] References Cited

U.S. PATENT DOCUMENTS

| | | | |
|---|---|---|---|
| 4,346,332 | 8/1982 | Walden | 315/307 |
| 4,857,806 | 8/1989 | Nilssen | 315/72 |
| 4,952,845 | 8/1990 | Veldman | 315/209 R |
| 5,032,782 | 7/1991 | Nilssen | 323/239 |
| 5,039,919 | 8/1991 | Nilssen | 315/209 R |
| 5,062,031 | 10/1991 | Flachenecker et al. | 363/16 |

FOREIGN PATENT DOCUMENTS

| | | | |
|---|---|---|---|
| 0075176 | 3/1983 | European Pat. Off. | 363/132 |
| 0313134 | 4/1989 | European Pat. Off. | 363/132 |
| 3312574 | 10/1984 | Germany | 363/132 |

*Primary Examiner*—Steven L. Stephan
*Assistant Examiner*—Matthew Nguyen
*Attorney, Agent, or Firm*—Kirschstein, Ottinger, Israel and Schiffmiller

[57] ABSTRACT

A resonant inverter has transistor switches (20, 30) arranged to conduct current from a d.c. source (10) alternately in one direction and the other through an inductor (40) and capacitor (42). The transistor switches (20, 30) are turned on alternately by signals from secondary windings (24, 34) of a drive transformer (44) having a primary winding (45) in series with the inductor (40) and capacitor (42). To control the output power of the inverter, a control circuit (50) senses reversal of current in through the inductor (40) and capacitor (42) and turns off one of the transistor switches (30) a predetermined time after current reversal. Current reversal is sensed by an additional transformer (60) having a primary winding (61) in series with the inductor (40) and capacitor (42). The control circuit (50) includes a timer (52) controlling the predetermined time, which may be varied to vary the power output of the inverter. A load (80) is connected across the inductor (40) or capacitor (42).

8 Claims, 2 Drawing Sheets

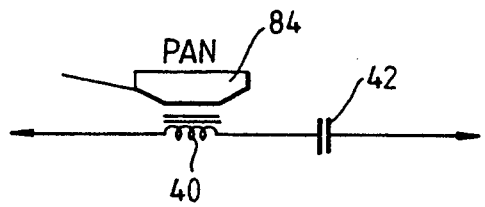
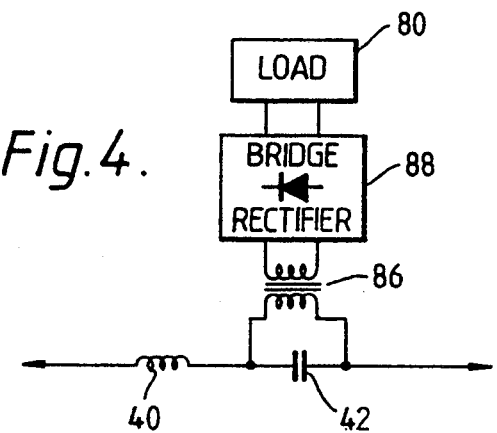
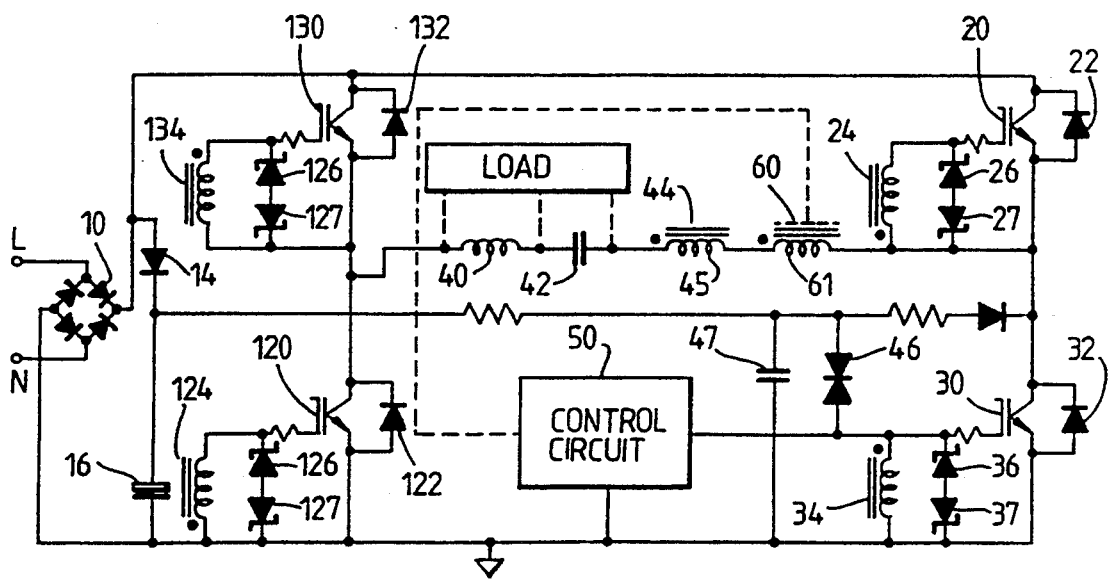

RESONANT INVERTER

BACKGROUND OF THE INVENTION

1. Field of the Invention

This invention relates to inverters.

More particularly, the invention relates to inverters of the kind comprising a resonant circuit including a capacitor and an inductor, a first main switching device arranged to conduct current from a d.c. source in one direction through the capacitor and inductor, a second main switching device arranged to conduct current from the d.c. source through the capacitor and inductor in the opposite direction, and drive means for causing the switching devices to conduct alternately, the drive means comprising a transformer having a primary winding in series with the capacitor and inductor and two secondary windings arranged to provide drive signals to the respective main switching devices.

2. Description of Related Art

An inverter of this kind is described in published European patent application EP-A-0 121 917. The described inverter operates at the resonant frequency of the resonant circuit, the main switching devices being switched at the zero crossing points of the oscillatory current in the resonant circuit, and there is no means of controlling the power output of the inverter.

A paper by Sebastian et al, entitled "Regulating Self-Oscillating Resonant Converters", 2nd European Conference on Power Electronics and Applications held at Grenoble, France, on 22-24 Sep., 1987 describes an inverter in which switching of the field-effect transistors forming the main switching devices is effected by two saturable transformers with primaries connected in the resonant circuit and secondaries connected to the gates of the field-effect transistors, so that the drive to each transistor is removed when the associated transformer saturates. Each transformer has an additional winding through which a variable controlled d.c. current is fed, to control the point at which the transformer saturates. The switching of the transistors can thereby be controlled to control the phase difference between the voltage and current in the resonant circuit so as to control the power output of the inverter. However, the described inverter is relatively complex.

SUMMARY OF THE INVENTION

It is an object of this invention to provide an improved inverter.

In accordance with this invention, an inverter of the kind set forth is provided with control means fop controlling the switching of the main switching devices, the control means comprising means for sensing reversal of current in the resonant circuit after one of the main switching devices has been turned on, means for turning off the switching device a predetermined time after current reversal, and means for varying the predetermined time.

Preferably, the means for sensing reversal of current comprises an additional transformer having a primary winding connected in the resonant circuit and a secondary winding connected to timing means operable to provide a signal for turning off the main switching device after the predetermined time.

In one form of the invention, the means for turning off the main switching device comprises a secondary switching device connected across the associated secondary winding of the drive transformer so as to remove the drive from the main switching device when the secondary switching device is turned on by the signal from the timing means.

Preferably, the drive transformer has a core of magnetisable material with a square hysteresis loop characteristic, so that following turning off of the said main switching device a predetermined time after current reversal, the other main switching device is turned off by saturation of the drive transformer after a period of time from the next current reversal equal to the said predetermined time.

In one form of the invention, the first and second main switching devices are connected in series across the d.c. source, two capacitors are connected in series across the d.c. source, and the capacitor and inductor of the resonant circuit are connected in series between the junction of the said two capacitors and the junction of the main switching devices.

In another form of the invention, the first and second main switching devices are connected in series across the d.c. source, and third and fourth main switching devices are connected across the d.c. source to form a bridge circuit with the first and second main switching devices, the capacitor and inductor of the resonant circuit being connected in series between the junction of the first and second main switching devices and the junction of the third and fourth main switching devices, and the drive transformer has additional secondary windings arranged to provide drive signals to the third and fourth main switching devices respectively so that the main switching devices in opposite arms of the bridge circuit are turned on simultaneously.

The inverter may be used to supply a load connected across the inductor or the capacitor of a resonant circuit. As described in move detail below, the circuit is a form of "Boucherot circuit", a characteristic of which is that the load current is independent of the load. As explained below, this gives the inverter of the present invention advantages, particularly when the inverter is connected to an a.c. mains supply and is used to supply a load at constant potential, for example a battery being charged, in that the current is taken from the mains supply at or close to unity power factor and with little or no harmonic content.

BRIEF DESCRIPTION OF THE DRAWINGS

The invention will now be described, by way of example, with reference to the accompanying drawings, in which:

FIG. 3 ad 4 illustrate alternative loads which can be supplied by the inverter, and FIG. 5 is a circuit diagram of a modified form of the inverter of this invention.

DETAIL DESCRIPTION OF THE PREFERRED EMBODIMENTS

Figure 1:
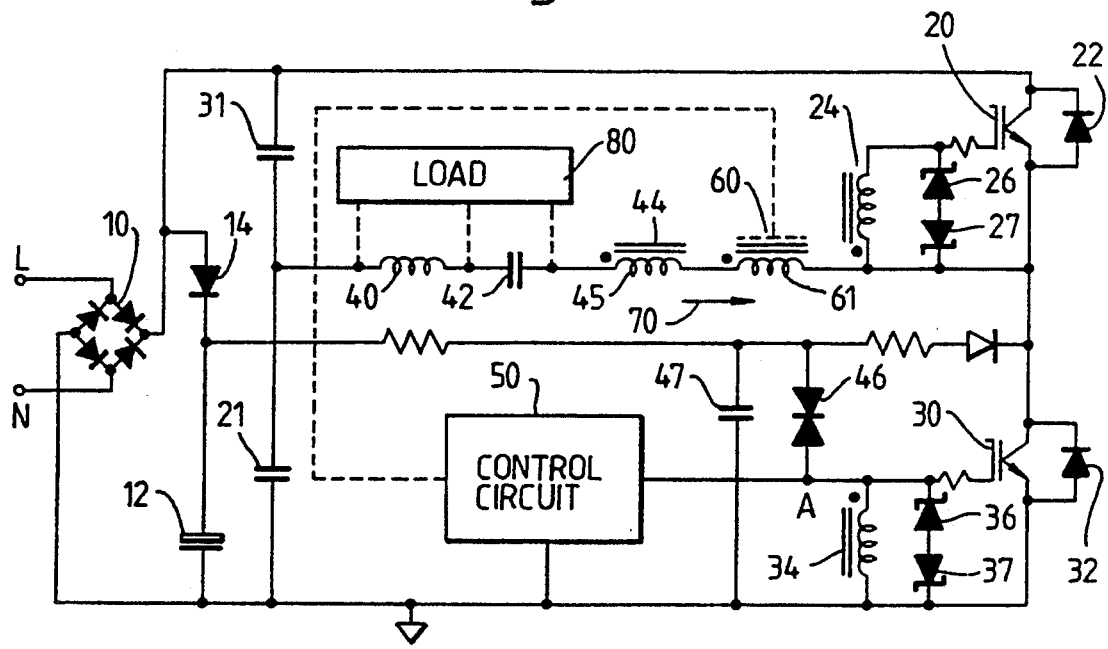
FIG. 1 is a circuit diagram of an inverter in accordance with this invention.

Referring to FIG. 1, the resonant inverter circuit is connected to a d.c. supply, provided by a full-wave rectifier 10, connected for example to the mains supply. A smoothing capacitor 12 is connected in series with a diode 14 across the d.c. supply.

The power circuit of the inverter comprises a bridge of two transistor switches 20 and 30 connected in series across the d.c. supply and two capacitors 21 and 31 also connected in series across the d.c. supply, and an inductor 40 and capacitor 42 connected in series between the junction of transistors 20 and 30 and the junction of capacitors 21 and 31. Diodes 22 and 32 are connected across transistors 20 and 30. The load 80 is connected to inductor 40 or capacitor 42, as described below with reference to FIGS. 3 and 4.

A drive circuit to effect switching of the transistors 20 and 30 consists of a drive transformer 44 having a primary winding 45 in series with the inductor 40 and capacitor 42 and two secondary windings 24 and 34 connected to the gates of transistors 20 and 30 respectively. Zener diodes 26 and 27 are connected across the secondary 24 to limit the voltage applied to transistor 20. Zener diodes 36 and 37 are similarly connected across secondary 34. Drive transformer 44 has a magnetisable core with a square hysteresis loop characteristic.

To initiate oscillation, a starting circuit is provided, consisting of a diac 46 connected between the positive line of the d.c. supply and the gate of transistor 30, and a capacitor 47 connected across the diac 46 and the secondary 34 of drive transformer 44.

Figure 2:
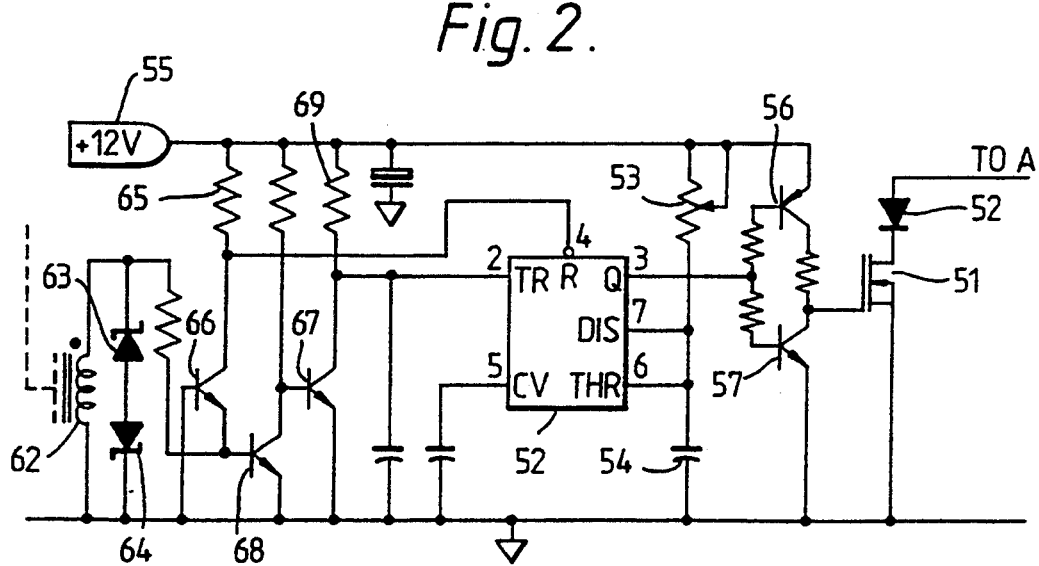
FIG. 2 is a diagram of a control circuit of the inverter.

To control the conduction times of the transistor switches 20 and 30, a control circuit 50 is provided, which will now be described with reference to FIG. 2. A field-effect transistor 51 is connected in series with a diode 52 across the secondary winding 34 of drive transformer 44, so that when transistor 51 is conducting, the drive is removed from transistor switch 30. Transistor 51 is controlled by means of an integrated circuit timer 52 of the well-known type "555". The characteristics of the timer 52 are such that the output at pin 3, is low when the voltages at the trigger pin 2 and the reset pin 4 are low. When the voltages at the trigger pin 2 and reset pin 4 go high, the output at pin 3 goes high, and remains high for a preset period, after which it reverts to the low value. The preset period is determined by the time constant of a potentiometer 53 and capacitor 54 connected to pins 6 and 7 of the timer 52 and to 12 volt supply 55, derived from the d.c. supply. The output of the timer 52 at pin 3 is applied to the gate of transistor 51 through transistors 56 and 57, which are also connected to the 12-volt supply, so that transistor 51 is turned on when the output at pin 3 is high.

The voltages applied to the trigger pin 2 and reset pin 4 of the timer 52 are derived from a current transformer 60, the primary winding 61 of which is connected in series with inductor 40 and capacitor 42, so as to sense the oscillatory current in the resonant circuit. Zener diodes 63 and 64 are connected across the secondary winding 62 of transformer 60, so that output of the transformer 60 appears as a square wave. The output is supplied to the emitter of a transistor 66, the base of which is connected to ground and the collector of which is connected to the reset pin 4 of the timer 52 and through resistor 65 to the 12-volt supply, so that when the output of the transformer current 60 is positive transistor 64 is non-conducting and the voltage at reset pin 4 is high. The output of the transformer 60 is also supplied to the base of transistor 66 so that when the output is positive transistor 68 is conducting and transistor 67 is held non-conducting so that the potential of the 12-volt supply is applied to the trigger pin 2 of timer 52 through resistor 69. When the output voltage of the current transformer 60 is negative, the voltages applied to the reset pin 4 and trigger pin 2 of the timer 52 are low.

In operation of the circuit, the main transistor 20 and 30 conduct alternately. Suppose that transistor 30 is conducting. Current flows in the direction shown by arrow 70 from the d.c. supply through capacitor 31, inductor 40, capacitor 42, the primaries 45 and 61 of transformers 44 and 60, and transistor 30. Transistor 30 is held conducting until the drive provided by the voltage across the secondary winding 34 of the drive transformer 44 falls to zero. Ignoring for the moment the operation of the control circuit 50, this occurs on saturation of the drive transformer 44, or when the current falls to zero, if this occurs before saturation. On switching off of transistor 30, the current (if it has not reached zero) is diverted through diode 22 until it falls to zero. The current in the resonant circuit will then reverse, flowing initially through capacitor 21 and diode 32. Reversal of the current through the primary 45 of drive transformer 44 generates a voltage across the secondary 24 which switches on transistor switch 20, so that current flows from the d.c. source through switch 20 and capacitor 21. Transistor 20 remains on until the transformer 44 saturates (or the oscillatory current falls to zero). When transistor 20 switches off, current flows through diode 32 until it falls to zero and reverses, flowing initially through diode 22, until the voltage across secondary 34 of drive transformer 44 turns on transistor 30 again.

Operation of the inverter, in the absence of the control circuit 50, would thus be similar to that of the prior art inverter referred to above. If the transistor 20 and 30 turn off when the oscillatory current falls to zero, the inverter will operate at its resonant frequency, with the output voltage developed across inductor 40 and capacitor 42 in phase with the oscillatory current. If the transistor 20 and 30 are turned off before the oscillatory current reaches zero, the output voltage is out of phase with the oscillatory current so that the power output of the inverter is reduced.

In accordance with the present invention, the control circuit 50 operates to turn off transistor switch 30 after a time determined by the setting of the potentiometer 53. The circuit operates as follows. When, in each cycle, the oscillatory current begins to flow in the direction shown by arrow 70 in FIG. 1, the voltage generated across the secondary 62 of current transformer 60 causes the potentials at the reset pin 4 and trigger pin 2 of the timer 52 to go high, so that the timer is initiated and the output at pin 3 goes high, holding transistor 51 non-conducting. The transistor switch 30 is therefore turned on by drive transformer 44, as described above. At the end of the period determined by the potentiometer 53 and capacitor 54 the output pin 3 goes low, and transistor 51 is turned on. The drive to the gate of transistor 30 is therefore removed and transistor 30 becomes non-conducting. The current flowing through inductor 40 and capacitor 42 is then diverted through diode 22 and flows through the circuit including diode 22 and capacitor 31, until the current falls to zero and begins to reverse, whereupon transistor 20 is turned on by the action of drive transformer 44. Since the core of transformer 44 has a "square loop" characteristic, it cannot sustain an output voltage integral in one sense greater than the other, and the core saturates, removing the drive from transistor 20, after a period, measured from current reversal, equal to the predetermined period (when the current is flowing in the opposite direction) after which transistor 30 is turned off by timer 52. After transistor 20 is turned off, the current flows through the circuit including diode 32 and capacitor 21 until it reverses, whereup transistor 30 is turned on by drive transformer 44, timer 52 is triggered by current transformer 60, and the cycle commences.

The power output of the inverter can thus be controlled by varying the setting of potentiometer 53.

The inverter can be used to supply various loads. FIG. 3 shows an example in which the inverter provides power for an induction hob 82. The inductor 40 is incorporated into the hob 82 so that the base of a ferrous metal pan 84 placed on the hob in close proximity to the inductor will be heated by induced high frequency eddy currents and hysteresis losses, to cook the pan contents.

FIG. 4 illustrates a more conventional load 90, connected to the capacitor 42 through an isolating transformer 86 and a rectifier 88. The load could, for example, be a rechargable battery or magnetron.

FIG. 5 shows a modified form of the inverter. The circuit is the same as that shown in FIGS. 1 and 2, except that the capacitors 21 and 31 of the FIG. 1 circuit have been replaced by two additional transistor switches 120 and 130. The drive transformer 44 has two additional secondary windings 124 and 134 connected to the gates of the additional transistors 120 and 130. Voltage-limiting zener diodes 126, 127 and 136, 137 are connected across the secondaries 124 and 134, and diodes 122 and 132 are connected across transistors 120 and 130. Secondary windings 124 and 134 are wound so that transistor 120 is turned on simultaneously with transistor 20 and transistor 130 is turned on simultaneously with transistor 30. Transistors 120 and 130 turn off when the drive transformer 44 saturates or the current through its primary winding 45 falls to zero. The control circuit 50 operates in the same way as in the embodiment of FIGS. 1 and 2.

The embodiment of FIG. 5 effectively provides a full bridge configuration as compared to the half-bridge configuration of FIG. 1. The voltage applied to the series resonant circuit in the embodiment of FIG. 5 is equal to the full supply voltage, rather than half the supply voltage in the FIG. 1 embodiment. The value of the oscillatory current is therefore reduced by half for the same output power. The embodiment of FIG. 5 thus has an advantage when operating at high power levels.

The circuits shown in FIGS. 1 and 4, in which the load is connected across the capacitor or inductor of a resonant circuit, are circuits of the kind known as a "Boucherot circuit". A characteristic of such a circuit is that the load current is independent of the load. In general, when such a circuit is operating at its resonant frequency the load current I is given by:

$$I = \frac{V}{\omega L}$$

where V is the voltage applied across the resonant circuit and L is the inductance of the circuit.

In the case of the circuit shown in FIG. 1, the effect of the control circuit 50 is to modify the Boucherot constant, so that the load current is given by:

$$I = \frac{V}{\omega L} \cdot \cos\phi$$

where $\phi$ is the phase angle between the resonant current and the switching sequence of transistor switches 20 and 30. The control circuit 50 operates to vary $\phi$ between 0°, at which the load current is maximum, and 90°, at which the load current is reduced to zero.

If the circuit is connected to an A.C. mains supply through a full-wave rectifier as shown in FIG. 1, the voltage across the resonant circuit, since capacitors 21 and 31 are small, is an unsmoothed rectified waveform whose amplitude is a rectified sinusoid of mains frequency. The output load current may therefore be expressed as:

$$I = \frac{V\sin\theta}{\omega L} \cdot \cos\phi$$

where $V\sin\theta$ is the instantaneous value of the supply potential.

The power supplied to the load is given by:

$$V_{load} \cdot I = V_{load} \cdot \frac{V\sin\theta}{\omega L} \cdot \cos\phi$$

where $V_{load}$ is the voltage across the load.

If the circuit is used to supply, for example, a battery being charged via a transformer rectifier, or a capacitor resistive load being charged to a constant potential, the voltage $V_{load}$ is constant, and the load power is proportional to $V\sin\theta$, ie. to the instantaneous value of the mains supply voltage. The current drawn from the mains supply must therefore be a square wave of unity power factor and phase.

The described circuit thus has advantages over conventional battery charger circuits or capacative input filters which take non-unity power factor currents with a harmonic content tending to contravene regulations relating to the harmonic content of mains supply current.

The circuit of FIG. 4 has the same advantages.

We claim:

1. An inverter for supplying power from a d.c. source to a load, comprising: a resonant circuit including a capacitor and an inductor; a first main switching device arranged to conduct current from the d.c. source in one direction through the capacitor and the inductor; a second main switching device arranged to conduct current from the d.c. source through the capacitor and the inductor in the opposite direction; drive means for causing the main switching devices to conduct alternately, said drive means comprising a drive transformer having a primary winding in series with the capacitor and the inductor, and two secondary windings arranged to provide drive signals to the respective main switching devices; and control means for controlling the switching of the main switching devices, said control means comprising means for sensing reversal of the current in the resonant circuit, means for turning off that one of the first and second main switching devices through which the reversed current is flowing a predetermined time after current reversal, and means for varying the predetermined time, thereby to vary the power supplied by the inverter to the load, said load being connected across one of the capacitor and the inductor of the resonant circuit, whereby the load current is substantially independent of the load at all settings of the control means.

2. An inverter as claimed in claim 1, in which the means for sensing reversal of current comprises an additional transformer having a primary winding connected in the resonant circuit and a secondary winding connected to timing means operable to provide a signal for turning off that one of the first and second main switching devices through which the reversed current is flowing after the predetermined time.

3. An inverter as claimed in claim 2, in which the means for turning off that one of the first and second main switching devices through which the reversed current is flowing comprises a secondary switching device connected across the associated secondary winding of the drive transformer so as to remove the drive means from the respective main switching device when the secondary switching device is turned on by the signal from the timing means.

4. An inverter as claimed in claim 1, in which the drive transformer has a core of magnetizable material with a square hysteresis loop characteristic, so that following turning off of that one of the first and second main switching devices through which the reversed current is flowing a predetermined time after current reversal, the other main switching device is turned off by saturation of the drive transformer after a period of time from the next current reversal equal to said predetermined time.

5. An inverter as claimed in claim 1, in which the first and second main switching devices are connected at a junction in series across the d.c. source, two capacitors are connected at a junction in series across the d.c. source, and the capacitor and the inductor of the resonant circuit are connected in series between the junction of said two capacitors and the junction of said main switching devices.

6. An inverter as claimed in claim 1, in which the first and second main switching devices are connected at a junction in series across the d.c. source, and third and fourth main switching devices are connected at a junction across the d.c. source to form a bridge circuit with the first and second main switching devices, the first and third main switching devices being in arms of the bridge opposite one another, and the second and fourth main switching devices being in arms of the bridge opposite one another, the capacitor and the inductor of the resonant circuit being connected in series between the junction of the first and second main switching devices and the junction of the third and fourth main switching devices, and the drive transformer has additional secondary windings arranged to provide drive signals to the third and fourth main switching devices, respectively, so that the third main switching device is turned on simultaneously with the first main switching device and the fourth main switching device is turned on simultaneously with the second main switching device.

7. An inverter as claimed in claim 1, in which each of the main switching devices is a transistor.

8. An inverter as claimed in claim 1, in which the d.c. source comprises a rectifier adapted to be connected to an a.c. mains supply.

* * * * *